United States Patent [19]

Malec

[11] 4,108,134

[45] Aug. 22, 1978

[54] MODULATOR VALVE

[76] Inventor: Jerry P. Malec, 10524 E. Pine, Tulsa, Okla. 74116

[21] Appl. No.: 699,937

[22] Filed: Jun. 25, 1976

[51] Int. Cl.$^2$ .............................................. F01M 1/00
[52] U.S. Cl. .............................. 123/196 R; 251/122; 137/505.41
[58] Field of Search ..................... 137/511, 513.5, 524, 137/505.13, 505.41, 505.42; 123/196 R; 251/122

[56] References Cited

U.S. PATENT DOCUMENTS

| | | | |
|---|---|---|---|
| 1,156,608 | 10/1915 | Marmon | 123/196 R |
| 1,929,108 | 10/1933 | Berry | 123/19 R |
| 3,127,879 | 4/1964 | Giacosa | 123/196 R |
| 3,187,775 | 6/1965 | Pinnell | 251/122 |
| 3,782,858 | 1/1974 | Peters | 137/505.41 |

FOREIGN PATENT DOCUMENTS 555,393  6/1923  France ................. 137/505.41

*Primary Examiner*—Ronald H. Lazarus

*Attorney, Agent, or Firm*—Zarley, McKee, Thomte, Voorhees & Sease

[57] ABSTRACT

A modulator valve assembly comprising a valve body having a first compartment area at one end thereof and an elongated bore extending therethrough from the inner end of the first compartment area. The first compartment area is closed by an inlet cap which is in operative communication with a source of fluid under pressure. A piston is slidably mounted in the bore and is provided with a pair of spaced-apart metering slots formed in the periphery thereof which extend between one end thereof and a reduced diameter portion. The valve body is provided with a discharge port formed therein which communicates with the bore intermediate the ends thereof. A spring is mounted in the bore to yieldably urge the piston towards the inlet cap so that the metering slots permit fluid to pass from the first compartment area to the discharge port. Means is provided in the port to limit the movement of the piston in one direction. An adjustment cap is threadably mounted on the valve body and may be selectively rotated with respect thereto to permit the tension in the spring to be varied.

9 Claims, 6 Drawing Figures

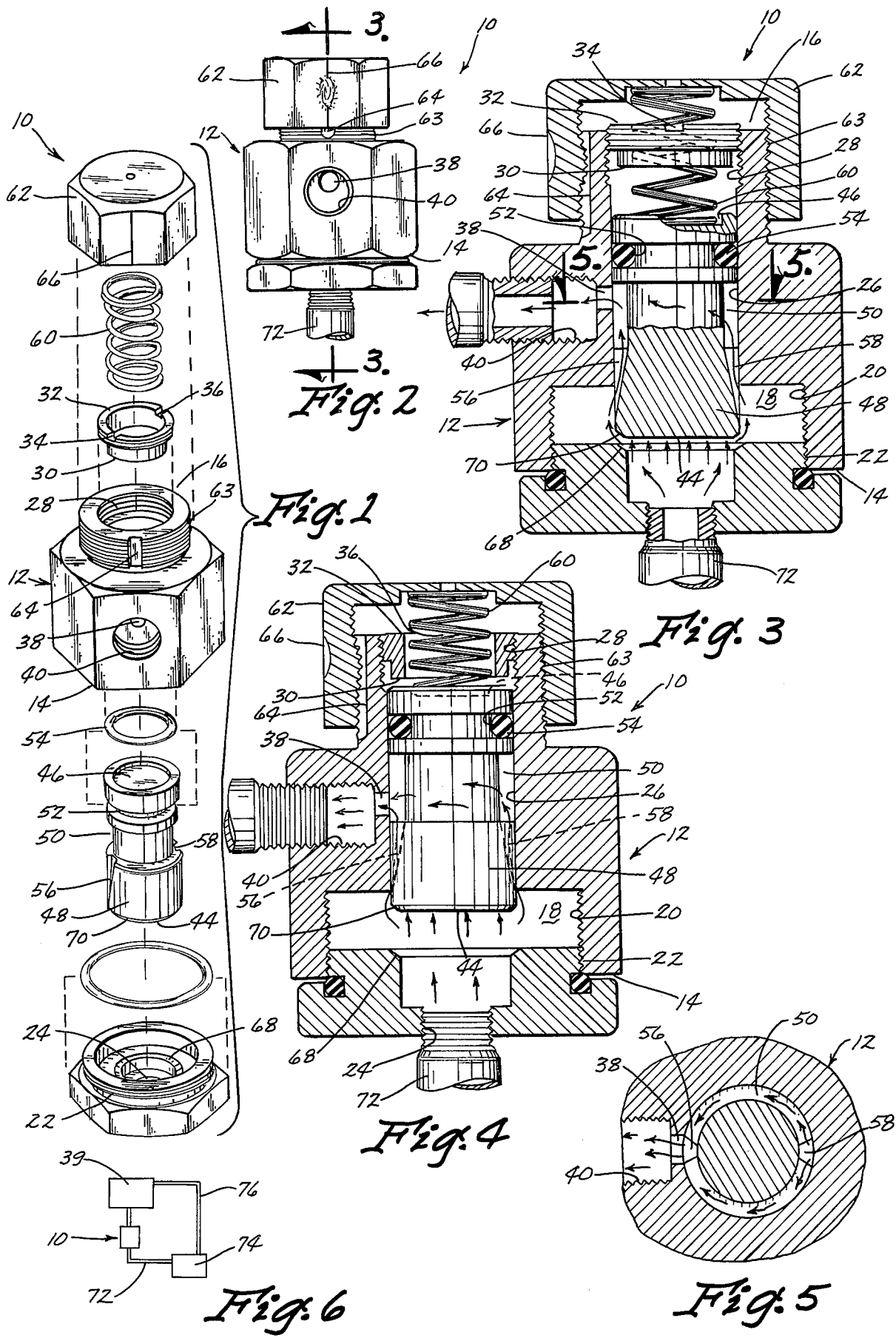

MODULATOR VALVE

BACKGROUND OF THE INVENTION

This invention relates to a modulator valve and more particularly to a modulator valve which is ideally suited for use with an oil filter or oil reclaimer.

Many types of pressure regulator valves have been previously devised but it is believed that the vast majority of the devices suffer serious shortcomings. In a conventional type of pressure regulator, the fluid flow is either "on" or "off". In other words, if sufficient pressure exists to open the regulator valve, substantially full flow is present. Conversely, if the regulator valve is not exposed to sufficient pressure to maintain the same in an open position, the regulator valve will be completely closed. Further, the conventional pressure regulators do not compensate for changes in viscosity, fluid temperature, etc.

When the fluid being regulated has a low temperature, the pressure exerted by the fluid on the regulator valve of the conventional devices will ordinarily cause the regulator valves to completely open which will supply greater than desirable volumes of fluid flow to the appliance requiring regulated fluid. Such is the case when a pressure regulator is being used in conjunction with an oil reclaimer or the like. When the engine is first operated, the engine oil will be cold and the increased oil pressure supplied to the regulator valve will cause the regulator valve to completely open which will cause an undesirable volume of oil to flow through the oil filter or oil reclaimer.

It is necessary that a substantially constant fluid flow be present in the oil filter or oil reclaimer to enable the filter or reclaimer to efficiently operate. With present valves, such even fluid flow is not possible.

Therefore, it is a principal object of the invention to provide a modulator valve for use with an oil filter, oil reclaimer, etc.

A further object of the invention is to provide a modulator valve comprising a movable piston having a pair of metering slots provided in the periphery thereof.

A still further object of the invention is to provide a modulator valve for use with an oil filter or oil reclaimer wherein substantially constant fluid flow is achieved through the filter or reclaimer.

A still further object of the invention is to provide a modulator valve which is economical to manufacture and durable in use.

These and other objects will be apparent to those skilled in the art.

BRIEF DESCRIPTION OF THE DRAWINGS

FIG. 1 is an exploded perspective view of the modulator valve of this invention;

FIG. 2 is a perspective view of the modulator valve;

FIG. 3 is a sectional view of the valve as seen on lines 3—3 of FIG. 2;

FIG. 4 is a sectional view of the modulator valve as seen on lines 4—4 of FIG. 3;

FIG. 5 is a plan view of the piston of this invention; and

FIG. 6 is a schematic illustrating the device being used with an oil reclaimer, etc.

SUMMARY OF THE INVENTION

The modulator valve of this invention is ideally suited for use with an oil reclaimer or the like. Ordinarily, the modulator valve would be imposed in the oil line extending between the engine and the oil filter or oil reclaimer. The modulator valve of this invention is responsive to changes in oil pressure, temperature, viscosity, etc. so as to achieve a substantially uniform oil flow through the filter or reclaimer to insure that efficient filtering or reclaiming is achieved. The modulator valve comprises a valve body having an elongated bore extending therethrough with a piston slidably mounted in the bore. A first compartment area is provided at one end of the valve body and is closed by a threadable inlet cap which is in operative communication with a source of oil which is under pressure. A spring is provided in the bore to urge the piston towards the compartment area so that the metering slots formed in the periphery of the piston will permit oil to bypass the piston and to pass outwardly from the valve body to the filter or reclaimer. A stop screw is also provided in the bore to limit the movement of the piston away from the first compartment area. An adjustment cap is threadably mounted on the valve body to permit the tension of the spring to be varied. The piston slidably moves in the bore to allow the V-shaped metering slots to supply fluid to the filter or reclaimer in a substantially even flow regardless of the pressure, viscosity or temperature of the oil.

DESCRIPTION OF THE PREFERRED EMBODIMENT

The modulator valve of this invention is referred to generally by the reference numeral 10. Valve 10 includes a valve body 12 having ends 14 and 16. Valve 10 is provided with a first compartment area 18 formed therein at end 14 and having internal threads 20 adapted to threadably receive an inlet cap 22. Cap 22 has a threaded opening 24 extending therethrough for receiving a suitable connector (not shown) which is in communication with a fluid (air or liquid) under pressure.

Bore 26 extends through valve body 12 from compartment area 18 towards end 16. Internal threads 28 are provided at one end of bore 26 for threadably receiving a ring shaped stop screw 30. Screw 30 has a central opening 32 and screwdriver slots 34 and 36. Port 38 extends from bore 26 to internally threaded outlet opening 40 which is adapted to threadably receive a suitable connector which is in communication with an appliance requiring regulated fluid pressure such as an oil filter, oil reclaimer, etc. generally referred to by the reference numeral 39 in FIG. 6. One type of oil reclaimer is disclosed in U.S. Pat. No. 3,616,885.

Piston 42 is slidably mounted in bore 26 and generally includes ends 44 and 46. Piston 42 has a cylindrical portion 48 at end 44. Reduced diameter portion 50 is formed at one end of portion 48 as seen in the drawings. Groove 52 is provided in piston 42 and end 46 which receives an O-ring 54.

Metering slots 56 and 58 are formed in the periphery of cylindrical portion 48 and extend from end 44 to the reduced diameter portion 50. As seen in the drawings, the width and depth of the slots 56 and 58 progressively increase from end 44 to the reduced diameter portion 50. Spring 60 is mounted in bore 26 to normally urge piston 42 towards inlet cap 22. Adjustment cap 62 is threadably mounted on threads 63 of valve body 12 and is selectively rotatable with respect thereto to permit the tension in the spring 60 to be selectively varied. As seen in the drawings, valve body 12 is provided with slot 64 formed in the threads 63. As also seen in the drawings, cap 62 is provided with a scoreline 66 for a purpose to be described in more detail hereinafter. Cap 62 is provided with a valve seat 68 formed therein adapted to receive the tapered portion 70 of piston 42.

In operation, the valve 10 would be placed in communication with the oil reclaimer or filter 39 as seen in FIG. 9. Oil under pressure is supplied to the valve 10 by means of the conduit 72 extending from the engine 74. The numeral 76 refers to a return line extending from the reclaimer or oil filter to the engine 74. Normally, spring 60 maintains the piston 42 in the position illustrated in FIG. 4 so that oil flowing from conduit 72 would enter the compartment area 18 and would pass through the metering slots 56 and 58, into the reduced diameter portion 50 and thence outwardly through the port 38 to the pipe 76. As oil pressure in pipe 72 and compartment area 18 increases, the piston 42 moves upwardly against the resiliency of the spring 60 so that less cross-sectional area of the metering slots 56 and 58 are exposed so that less oil will pass therethrough such as would be the case when the engine is first started and the oil is not warmed to its operating temperature. Thus, the piston 42 prevents large surges of oil pressure being supplied to the reclaimer 39. The configuration of the metering slots 56 and 58 insures that the proper amount of oil will be supplied to the reclaimer 39 regardless of the pressure, temperature, etc. of the oil since the piston automatically compensates for the same.

The piston 42 may also move downwardly until the tapered portion 70 seats and seals upon the valve seat 68. This is important in that it prevents back flow of unfiltered oil to the crank case via the device. The device also prevents the oil in the reclaimer 39 from draining back into the engine 74 which would give a false oil level reading in the engine. The device further prevents the refiner from operating at pressures below that which are determined by the individual manufacturers. Thus, it can be seen that a novel modulator valve has been provided wherein the device automatically compensates for changes in viscosity, fluid temperature, pressure, etc. It can also be seen that the device permits a constant flow of fluid to be supplied to the oil filter or oil reclaimer to enable the filter or reclaimer to efficiently operate. Thus it can be seen that the device accomplishes at least all of its stated objectives.

I claim:

1. A modulator valve assembly comprising,
    a valve body having an elongated bore formed therein having opposite ends, said valve body having a first compartment area formed therein adjacent one end of said bore and communicating therewith,
    a fluid inlet opening in said body communicating with said first compartment area,
    a fluid discharge opening formed in said valve body communicating with said bore intermediate the ends thereof,
    a piston slidably mounted in said bore,
    said piston having a first cylindrical portion at one end thereof with a diameter substantially equal to the diameter of said bore, said first cylindrical portion having an end portion positioned adjacent said first compartment area,
    said piston having a reduced diameter portion intermediate the ends thereof between said first cylindrical portion and the other end of said piston,
    a seal means embracing said piston between said reduced diameter portion and said other end of said piston which sealably and slidably engages the wall surface of said bore,
    said piston having at least one elongated metering slot formed in the periphery of said first cylindrical portion, said metering slot having one end thereof spaced from said end portion of said first cylindrical portion and having a second end communicating with said reduced diameter portion, said slot being substantially V-shaped in cross-section and progressively increasing in depth and width from its said one end to its said second end,
    said piston being movable in one direction in said bore in response to inlet fluid pressure exerted on said end portion of said first cylindrical portion, said piston being movable between a first position whereby said metering slot communicates with said inlet opening and said first compartment area to a second position whereby said metering slot does not communicate with said fluid inlet opening and said first compartment area, said reduced diameter portion communicating with said fluid discharge opening when said piston is in at least its said first position,
    a spring means in said bore normally urging said piston towards its said first position,
    and means maintaining said spring means in said bore, 2. The valve assembly of claim 1 wherein a stop means is positioned in said bore to limit the travel of said piston at its said second position.

3. The valve assembly of claim 2 wherein said means maintaining said spring means in said bore comprises a cap adjustably threadably mounted on said body.

4. The valve assembly of claim 3 wherein means maintains said cap in various positions of rotation relative to said body.

5. The valve assembly of claim 1 wherein a pair of spaced apart metering slots are formed in said piston.

6. The valve assembly of claim 1 wherein a valve seat is formed in said body at said fluid inlet opening, said piston having a valve portion provided on said end portion for seating engagement with said valve seat.

7. In combination,
    an appliance requiring oil to be supplied thereto under pressure, an engine means,
    a modulator valve comprising a valve body having an elongated bore formed therein having opposite ends, said valve body having a first compartment area formed therein adjacent one end of said bore and communicating therewith; a fluid inlet opening in said body communicating with said first compartment area, said fluid inlet opening being in communication with an oil line extending from said engine means, a fluid discharge opening formed in said valve body communicating with said bore intermediate the ends thereof, said fluid discharge opening being in communication with said appliance, a piston slidably mounted in said bore, said piston having a first cylindrical portion at one end thereof with a diameter substantially equal to the diameter of said bore, said first cylindrical portion having an end portion positioned adjacent said first compartment area, said piston having a reduced diameter portion intermediate the ends thereof between said first cylindrical portion and the other end of said piston, a seal means embracing said piston between said reduced diameter portion and said other end of said piston which sealably and slidably engages the wall surface of said bore, said piston having at least one elongated metering slot formed in the periphery of said first cylindrical portion, said metering slot having one end thereof spaced from said end portion of said first cylindrical portion and having a second end communicating with said reduced diameter portion, said slot being substantially V-shaped in cross-section and progressively increasing in depth and width from its one end to its said second end, said piston being movable in one direction in said bore in response to inlet fluid pressure exerted on said end portion of said first cylindrical portion, said piston being movable between a first position whereby said metering slot communicates with said inlet opening and said first compartment area to a second position whereby said metering slot does not communicate with said fluid inlet opening and said first compartment area, said reduced diameter portion communicating with said fluid discharge opening when said piston is in at least its said first position, a spring means in said bore normally urging said piston towards its said first position, and means maintaining said spring means in said bore.

8. The combination of claim 7 wherein said appliance comprises an oil reclaimer.

9. The combination of claim 7 wherein said appliance comprises an oil filter.

* * * * *